No. 725,098. PATENTED APR. 14, 1903.
W. F. LEARNED.
FORM OR CENTER FOR MOLDING THE INVERTS OF CONCRETE CONDUITS.
APPLICATION FILED DEC. 22, 1902.
NO MODEL.
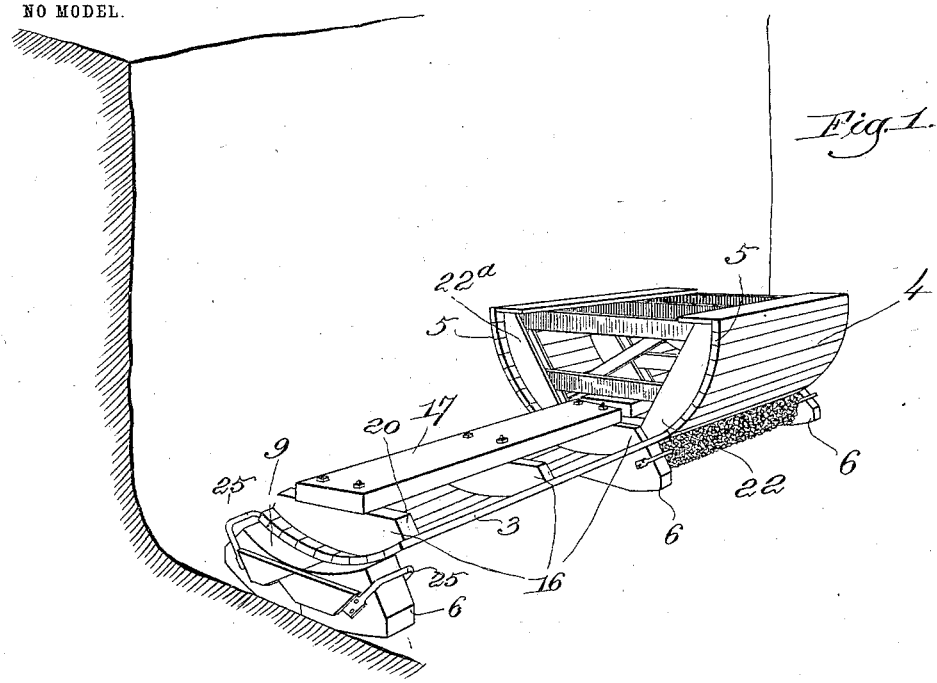
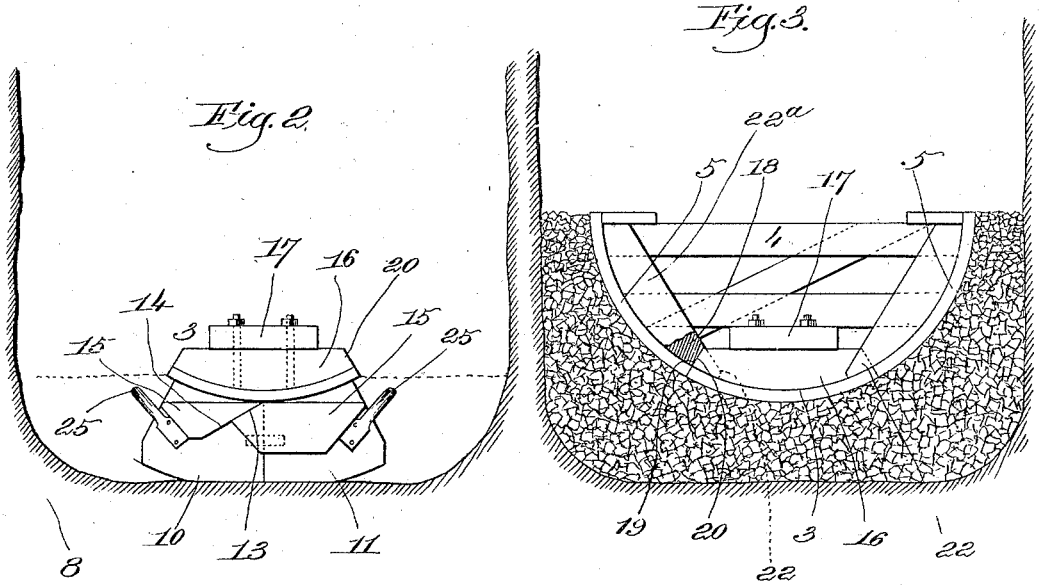
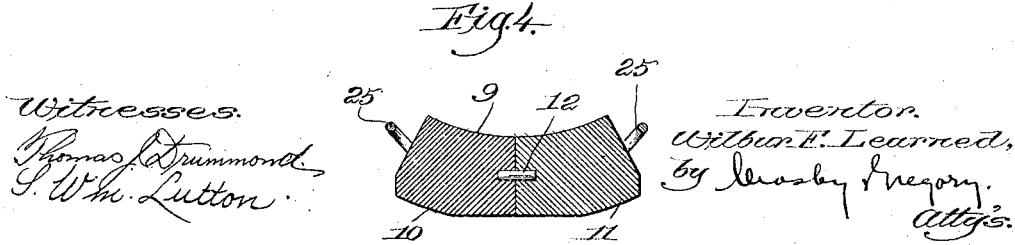
Witnesses
Thomas J. Drummond
S. Wm. Lutton
Inventor
Wilbur F. Learned,
by Crosby & Gregory
Attys.
THE NORRIS PETERS CO., PHOTO-LITHO., WASHINGTON, D. C.

UNITED STATES PATENT OFFICE.

WILBUR F. LEARNED, OF WATERTOWN, MASSACHUSETTS.

FORM OR CENTER FOR MOLDING THE INVERTS OF CONCRETE CONDUITS.

SPECIFICATION forming part of Letters Patent No. 725,098, dated April 14, 1903.

Application filed December 22, 1902. Serial No. 136,157. (No model.)

*To all whom it may concern:*

Be it known that I, WILBUR F. LEARNED, a citizen of the United States, and a resident of Watertown, county of Middlesex, State of Massachusetts, have invented an Improvement in Forms or Centers for Molding the Inverts of Concrete Conduits, of which the following description, in connection with the accompanying drawings, is a specification, like figures on the drawings representing like parts.

In the manufacture of concrete conduits, drains, sewers, &c., the difficulty of properly molding the inverts of the conduits, drains, &c.—that is, the portion of the conduit below the horizontal diameter—has led to the use of sectional invert-forms.

It is the object of my invention to provide a novel sectional form or center for use in molding the inverts of concrete conduits and a novel way of supporting said forms in the trench while the concrete is being molded thereabout, whereby the operation of building or molding the invert portion of a concrete conduit is rendered easy and the time necessitated to complete the operation is reduced to a minimum.

My improved form comprises a bottom section and one or more upper sections adapted to be supported thereon, and in accordance with my invention I employ cradles of a novel form for supporting the ends of the bottom sections. The cradles are employed to support the meeting ends of the bottom sections of adjacent forms or centers, whereby the said bottom sections of the forms or centers are supported some distance from the bottom of the trench in which the conduit is to be constructed. Since the bottom section of each form is comparatively narrow, it is an easy matter to pack and tamp the concrete under said sections. The cradles are preferably made sectional, so that when the concrete which has been placed under the bottom section of the forms has hardened the said cradles may be removed and the place occupied by them filled with concrete. Subsequently the upper section or sections of the forms are placed on the bottom sections, and as the only space remaining to be filled with concrete is at the sides of said upper sections it is a very simple matter to finish molding the invert portion of the conduit. When the invert portion of the conduit is finished, the arch or upper half of it will be made by means of any of the centers now commonly employed.

Referring to the drawings, Figure 1 is a perspective view of the forms embodying my invention, one of the forms being shown entire, while the bottom section of the other form only is shown. Fig. 2 is an end view of the bottom section of one of the forms, showing the manner of supporting it in a trench while the concrete is molded around it. Fig. 3 is an end view of the section completed, showing the invert portion of a concrete conduit fully molded; and Fig. 4 is a section through one of the cradles.

In the embodiment of my invention herein illustrated the form comprises the bottom section 3 and the top section 4, the top section comprising the two curved side pieces 5, which are rigidly secured together and which when in position are adapted to be supported on the bottom section 3. When the two sections of the form are placed together, they make a complete invert-form, as shown in Fig. 3.

The bottom sections 3 are adapted to be supported upon cradles 6, so that said sections will be held above the bottom of the trench 8 in which the conduit is to be built, the cradles, it being understood, resting upon the bottom of the trench. The upper face 9 of each of the cradles is curved to fit the contour of the bottom section 3, as seen in Figs. 1 and 2, and preferably the cradles will each be in the form of sectional cradles—that is, made in two separable parts or members 10 and 11, which may be interlocked together in any suitable way, as by a dowel-pin 12 in one of the parts which is adapted to enter a socket in the other part. In order to prevent the cradles from buckling under the weight of the bottom sections 3 of the form, I prefer to provide the member 11 with an inclined shoulder 13, which engages a corresponding inclined shoulder 14 on the member 10. In this embodiment of my invention these shoulders are formed by the inclined ends of cleats 15, secured to the sides of the members.

The lower sections 3 may be made in any suitable way; but I have herein chosen to illustrate them as having the cross-pieces 16, to which the boards forming the shell of said sections are secured and which are joined together in any suitable way, as by a member 17. The shell or surface of the sides 5 of the top section are secured to cross-pieces or cleats 18, which have their ends 19 shaped to abut against the inclined ends 20 of the cross-pieces 16, as shown in Fig. 3, when the top section 4 is set over the bottom section 3. Longitudinal movement of the two sections of any form relative to each other is prevented by the projecting ends 22 of the cleats 22ª, which are adapted to embrace the ends of the cross-pieces or cleats 16 on the bottom section 3. The two side pieces 5 of the top section may be tied together and braced in any suitable way.

In the operation of building a concrete conduit with my improved form the cradles 6 are first placed on the bottom of the trench and at the proper distance apart to support the ends of the bottom section 3. The width of the cradles is such that each cradle may support the two abutting ends of the bottom sections 3 of adjacent forms, as shown in Fig. 1. The concrete is now deposited and tamped or compacted under the bottom sections 3 of the forms, as shown to the right in Fig. 1, and the trench is filled to substantially the level of the top of the bottom section, as shown by dotted lines, Fig. 2. Since the bottom section 3 is comparatively flat, it will be seen from Fig. 2 that the space beneath said section is easy of access and that the matter of filling said space with concrete to form the bottom of the invert portion of the conduit is comparatively easy. When the concrete thus molded has hardened, the cradles 6 are removed by withdrawing the members 10 and 11 of each cradle separately. For this purpose I may provide each cradle member with loops 25, which form handles by which they may either be grasped by hand or in any suitable way. After the cradles have been removed the space occupied by them will be filled with concrete and then the top section 4 placed in position as shown to the right, Fig. 1, and in Fig. 3. The only space now remaining to be filled with concrete is that at the sides of the top section, which, as seen from Fig. 3, is readily accessible, and when this space has been filled, as shown in Fig. 3, the invert portion of the conduit is completed and the arch or top portion may be formed in any suitable or usual way. When the conduit is completely built, the sectional centers employed may be taken apart and removed, as usual in this art. It will be understood, of course, that where the conduit is being built on a curve the forms will be correspondingly curved.

While I have illustrated herein one particular way in which the sectional forms may be constructed, I do not wish to be limited to the precise construction shown, as it will be obvious that the two sections of the form may be made in a variety of ways and yet be capable of being used as above described.

In building conduits of a relatively small size I prefer to use a form having two sections only—that is, one in which the top section is one integral piece. In building the larger-size conduit, however, I find it more convenient to make that portion of the form above the bottom section 3 in two or more separable parts. In this case the complete form for the invert would comprise a bottom section and a plurality of superimposed upper sections supported on the bottom section, and in using this form of the invention the upper sections would be put in place successively and the concrete filled in at the sides of each section before the next section was put in place. My invention, therefore, includes a form made in separable sections and cradles to support the bottom section regardless of the number of sections in each form.

Having described my invention, what I claim as new, and desire to secure by Letters Patent, is—

1. As a means for building the inverts of concrete conduits, a series of cradles, and a series of sectional invert forms or centers, each form or center comprising a bottom section to rest directly on the cradles and a top section adapted to be removably supported on the bottom section, said cradles being adapted to be removed from the trench in which the conduit is being built independently of the forms or centers.

2. As a means for building the inverts of concrete conduits, a sectional invert-form comprising separable top and bottom sections, and means to support the bottom section above the bottom of the trench in which the conduit is to be built while the space beneath said section is being filled with concrete, said means being removable from the trench independently of the invert-form, the construction being such that the top section may be put in place on the bottom section after the space beneath the bottom section has been filled as described.

3. A sectional form for molding the inverts of concrete conduits comprising a bottom and a top section separable from each other and the latter adapted to be supported on the former, combined with a plurality of cradles on which said bottom sections are adapted to rest, said cradles having their upper faces shaped to correspond to the contour of the bottom section and being capable of being removed from the trench in which the conduit is being built prior to the removal of the form.

4. As a means for building the inverts of concrete conduits, a series of sectional invert-forms, each form comprising a bottom and a top section separable from each other, and supporting devices to support the bottom section of each form above the bottom of the trench in which the conduit is to be formed while the space beneath the said section is being filled with concrete, each supporting device being removable from the trench prior to the removal of the form-section temporarily supported thereon, and the top section of each form being adapted to be supported on the corresponding bottom section while the spaces at the sides of said top section are being filled with concrete.

5. As a means for molding the inverts of concrete conduits, a plurality of sectional forms each comprising a bottom and a top section and removable cradles to support the meeting ends of the bottom sections of adjacent forms, said top sections being adapted to be removably sustained by the bottom sections.

6. Devices for molding the inverts of concrete conduits comprising a plurality of sectional forms each having a bottom and a top section, and cradles formed in separable sections and adapted to support the meeting ends of the bottom sections of adjacent forms, each top section being adapted to be removably sustained by the corresponding bottom section.

7. As a means for building the inverts of concrete conduits, a series of cradles each comprising two separable members interlocked together, and a series of invert forms or centers, each form comprising a bottom section to rest directly on certain of the cradles and a top section to be removably supported on the bottom section.

8. As a means for building concrete conduits, a sectional form comprising a bottom section and a separable top section adapted to be supported thereby, and cradles to support the bottom section, said cradles each comprising two separate members interlocked together and having means to prevent said cradles from buckling.

9. As a means for building the inverts of concrete conduits, a series of invert forms or centers, each comprising a plurality of superposable sections, and a series of cradles to form a temporary support for the bottom sections of each form and hold said sections above the bottom of the trench in which the conduit is to be built, said cradles being adapted to be removed from the trench prior to the removal of the section supported thereon.

10. As a means for building the inverts of concrete conduits, a series of invert forms or centers, each comprising a plurality of superposable separable sections, and means to support the bottom section above the bottom of the trench in which the conduit is to be built while the space beneath said section is being filled with concrete, said means being removable from the trench prior to the removal of the bottom section and without disturbing the latter.

11. A form for building the inverts of concrete conduits, comprising a plurality of superposable separable sections, means to support the bottom section above the bottom of the trench in which the conduit is to be built while the space beneath said section is being filled with concrete, and means to lock the sections of any one form against relative longitudinal movement when they are superposed one on the other.

12. A sectional form for building the inverts of concrete conduits comprising a bottom section and a top section adapted to be supported on said bottom section, said top section having means to interlock with the bottom section whereby relative longitudinal movement between said sections is prevented.

In testimony whereof I have signed my name to this specification in the presence of two subscribing witnesses.

WILBUR F. LEARNED.

Witnesses:
LOUIS C. SMITH,
GEO. W. GREGORY.